May 31, 1949.　　　P. F. OVERMYER　　　2,471,494
AUTOMATIC MEASURING DEVICE FOR BULK MATERIAL
Filed May 21, 1945　　　　　　　　　　　　4 Sheets-Sheet 1
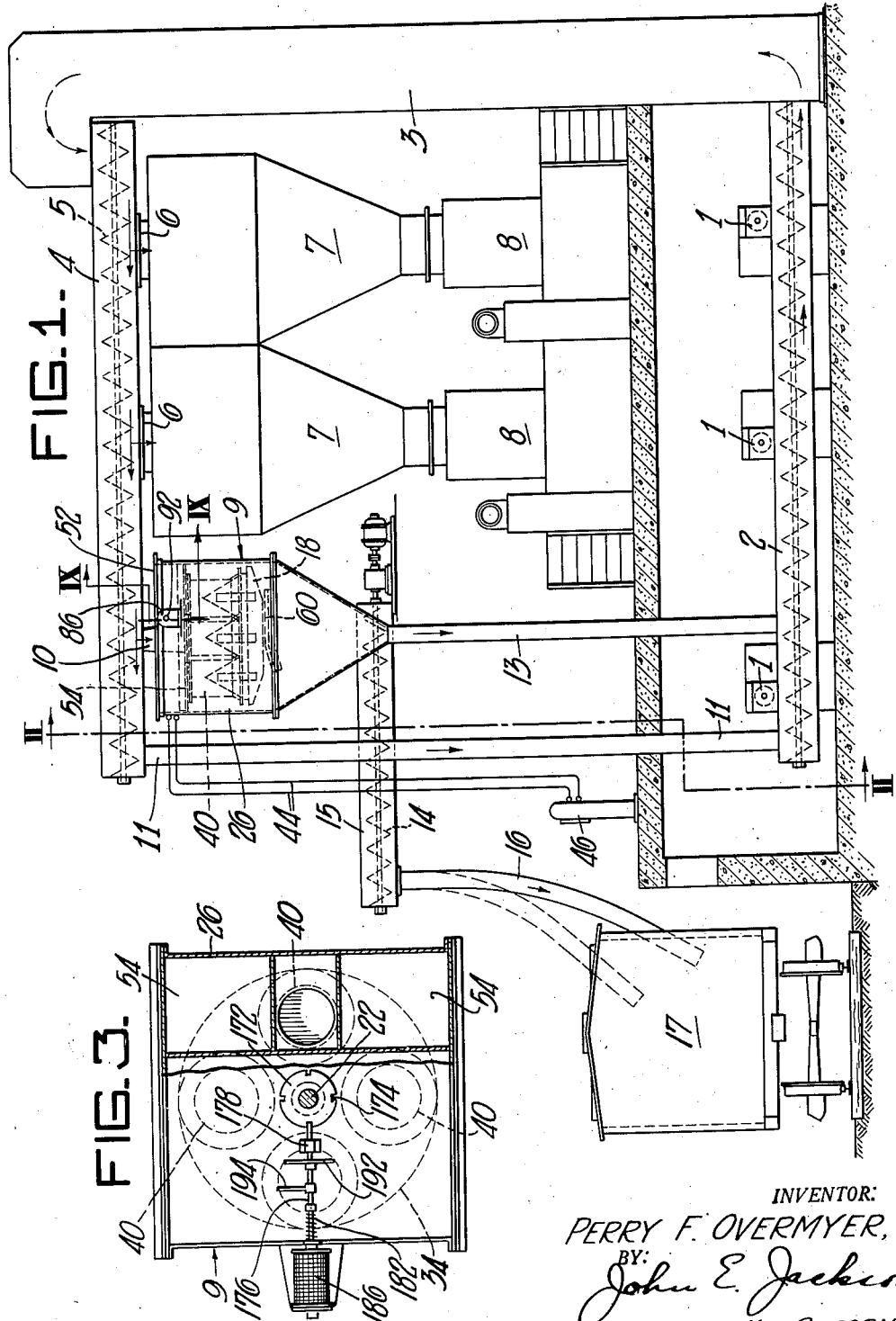
INVENTOR:
PERRY F. OVERMYER,
BY: John E. Jackson
HIS ATTORNEY.

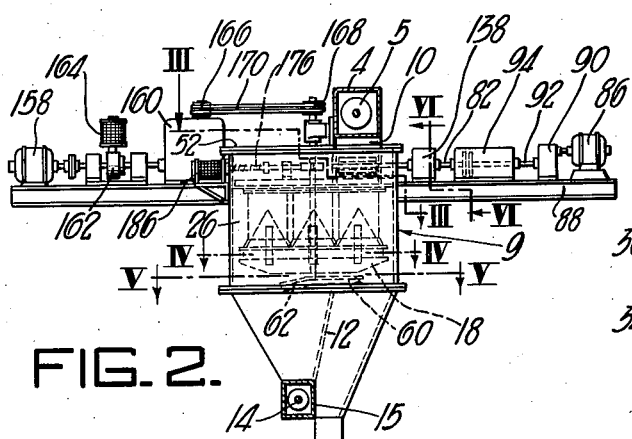
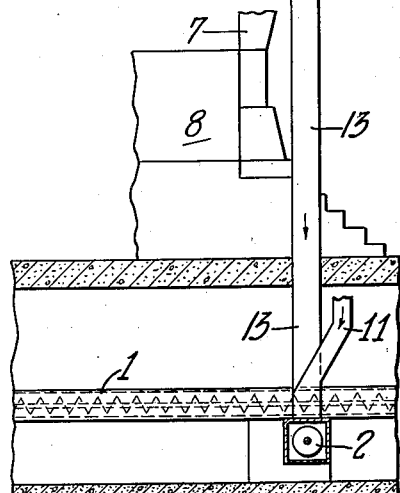
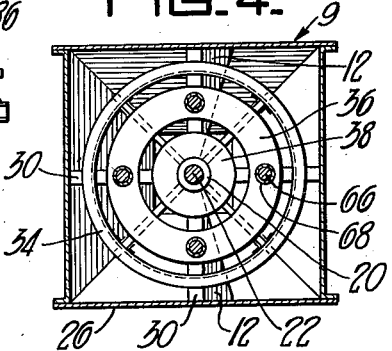
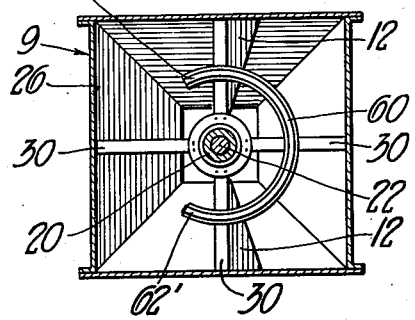
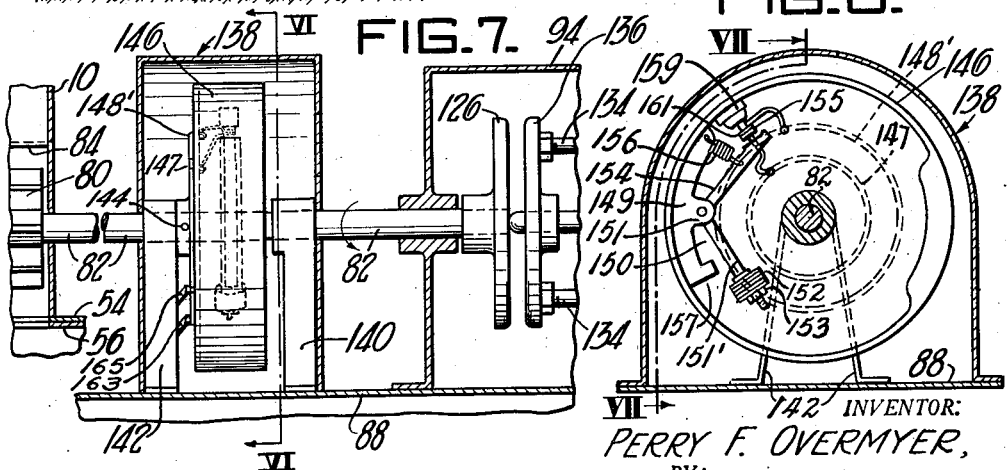

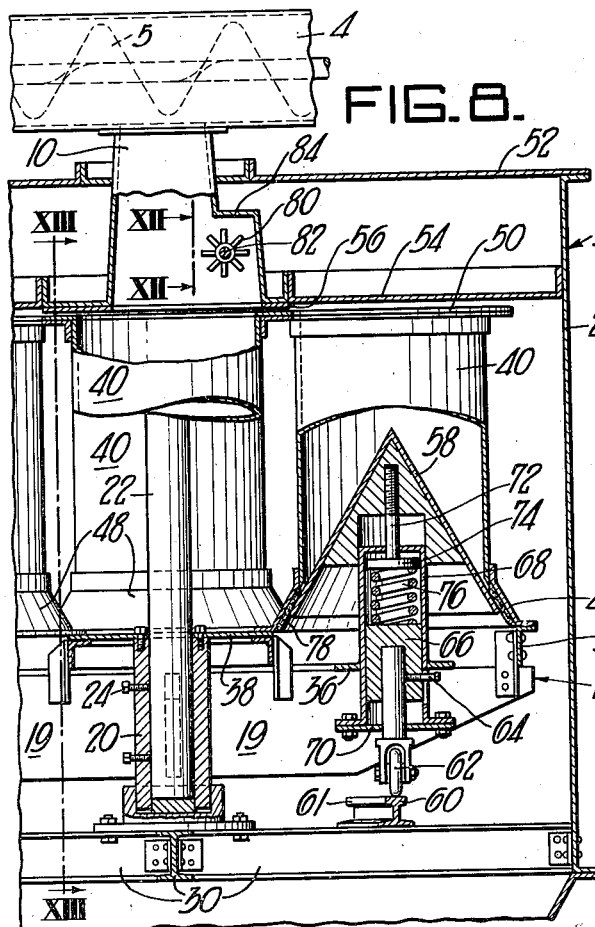
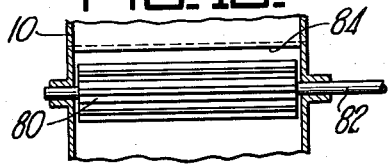
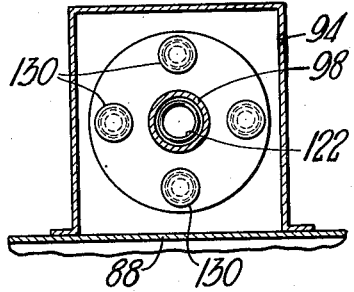
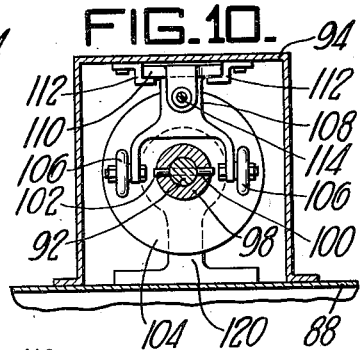
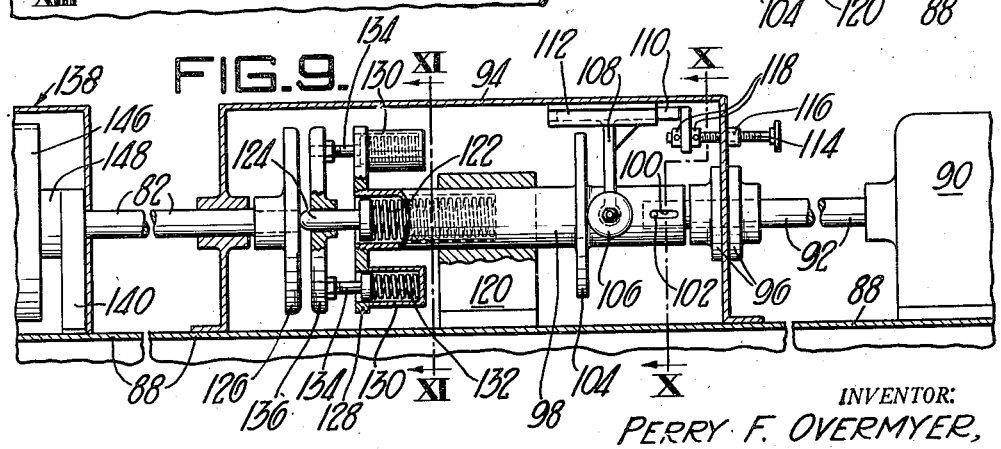

May 31, 1949.  P. F. OVERMYER  2,471,494
AUTOMATIC MEASURING DEVICE FOR BULK MATERIAL
Filed May 21, 1945  4 Sheets-Sheet 4
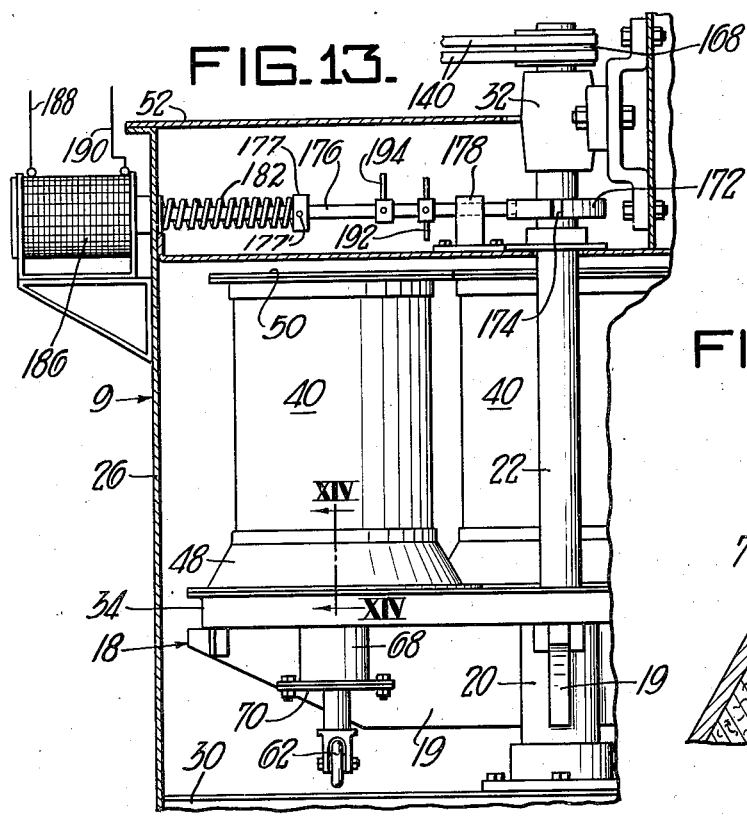
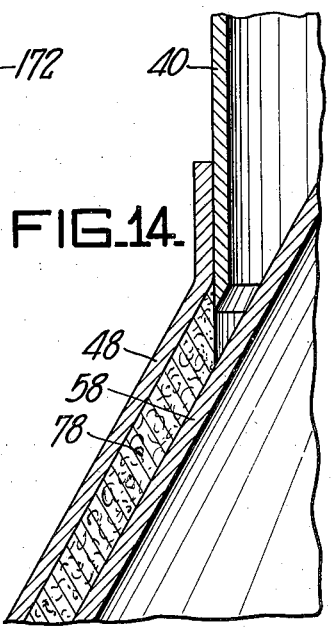
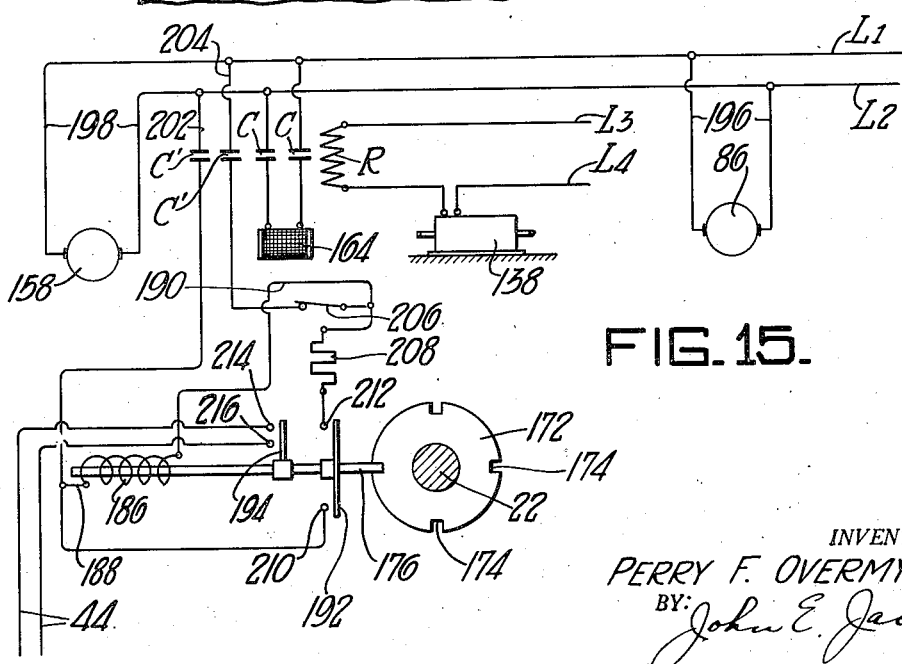
INVENTOR:
PERRY F. OVERMYER,
BY: John E. Jackson
HIS ATTORNEY.

Patented May 31, 1949

2,471,494

UNITED STATES PATENT OFFICE 2,471,494

AUTOMATIC MEASURING DEVICE FOR BULK MATERIAL

Perry F. Overmyer, Chicago, Ill., assignor to Universal Atlas Cement Company, a corporation of Indiana Application May 21, 1945, Serial No. 594,979

5 Claims. (Cl. 73—218)

This invention relates to apparatus for measuring bulk material such as cement, lime, or various other kinds of pulverized and dry building materials. The apparatus may also be used in measuring such materials as grains, either ground or unground.

One of the objects of the present invention is to provide automatic volume measuring apparatus for finely divided or pulverulent material.

Another of the objects of the invention is to provide an apparatus of simple and rugged construction and arrangement of parts so that it will withstand considerable wear without requiring unnecessary or fine adjustments to maintain it in satisfactory functioning operation.

In the loading of large containers, e. g., railroad cars, with pulverulent material such as cement, for shipment, it has been customary to deliver an amount of material estimated to approximate the desired load, and then to shift the car to a track scale for weighing. If the weight deviates more than the allowable amount from the desired load, it is usually necessary to shift the car back to the loading station and correct such deviation, involving a loss of time and increased cost.

The mechanism of the present invention is designed to overcome such difficulties by continuously measuring the volume of pulverulent material delivered to the bulk container such as a car, the material being delivered under such conditions that the ratio of volume to weight is substantially a constant. Thus the invention, by measurement of the volume of pulverulent material loaded, gives a measurement at all times, within commercial tolerances, of the weight of material loaded, thereby allowing the container to be filled with exactly a desired volume or weight of material without the necessity of subsequent weighing and load correction.

One selected embodiment of the mechanism of the present invention is shown in the accompanying drawings for purposes of illustration, but various changes or modifications may be made therein without departing from the spirit and scope of the invention.

Figure 1 is a diagrammatic view in elevation of a packing machine or plant embodying the present invention;

Figure 2 is a section taken on the line II—II of Figure 1;

Figure 3 is a section taken on line III—III of Figure 2;

Figure 4 is a section taken on line IV—IV of Figure 2;

Figure 5 is a transverse section taken along line V—V of Figure 2;

Figure 6 is a section taken on line VI—VI of Figures 2 and 7;

Figure 7 is a section taken along line VII—VII of Figure 6;

Figure 8 is an enlarged fragmentary view of the means for filling and dumping the plurality of volume measuring containers shown generally in Figure 1;

Figure 9 is a section taken on line IX—IX of Figure 1;

Figure 10 is a section taken on line X—X of Figure 9;

Figure 11 is a section taken on line XI—XI of Figure 9;

Figure 12 is a fragmentary section taken on line XII—XII of Figure 8;

Figure 13 is a fragmentary view in section taken along the line XIII—XIII of Figure 8;

Figure 14 is a fragmentary section taken along the line XIV—XIV of Figure 13; and Figure 15 is a schematic wiring diagram for the apparatus described.

In Figure 1 there is shown a portion of a conventional packing plant embodying the apparatus of the present invention. The packing plant includes a helical conveyor 2 at the bottom thereof, which may in turn receive the pulverulent material from one or more conveyors 1 spaced along conveyor 2. Three such delivery conveyors 1 are shown of the helical type.

The helical conveyor 2 delivers the material to an elevator 3, wherein the material is carried by a suitable means to the top of the plant. The elevator discharges into one end of the helical conveyor box 4, wherein the material is carried along by helical conveyor screw 5 to the gates 6 of the hoppers 7. At the lower end of the hoppers 7, packing stations 8 are suitably arranged and disposed to package the material delivered from the various hoppers 7. So much of the plant as has been thus far described may be considered to be conventional, but the showing serves to make clear the arrangement and disposition of the mechanism hereinafter to be more fully considered and constituting the subject matter of the present invention.

Such mechanism is employed in the plant shown in order to provide a check and record of the amount or quantity of material that is delivered to and passing through one of the hoppers, such as the one designated as 9 in Figure 1. The apparatus of the present invention is shown, in general arrangement with regard to other mechanism of the plant in Figure 1, and in greater detail in Figures 2 to 15, inclusive.

Hopper 9, wherein the volume measuring apparatus is located, is fed with pulverulent material from conveyor 4 through spout 10. Excess material which has not been delivered to hoppers 7 or to hopper 9 through spout 10, is by-passed from the end of conveyor 4 through pipe 11 to conveyor 2 for recirculation. After being measured by the measuring apparatus in hopper 9, the pulverulent material is dumped therefrom into the left hand side of the bottom of hopper 9 (Figure 2), which is separated from the right hand side thereof by transverse partition 12 (see Figure 2). The right hand side of the bottom of hopper 9 receives material unavoidably spilled or scraped off during rotation of the measuring containers from their filling to their emptying position. The material falling into the right hand side of hopper 9 is likewise returned to conveyor 2 for recirculation, in this instance by pipe 13.

The measured pulverulent material is delivered from the left hand side of the bottom of hopper 9 by means of screw conveyor 14 contained in conveyor housing 15, to the car filling pipe 16 for filling car 17 either from the side or from the top, as shown.

The automatic measuring device for the pulverulent material is shown in general in Figure 1 and in more detail, as to certain parts thereof, in Figures 2, 3, 4, 5, and 8. In the device shown, a table or a support 18 is formed by vertical plates 19 positioned at right angles to each other (see Figures 4 and 8) and welded to hub 20, which is secured to vertical shaft 22 by set screws 24. Shaft 22 is located for rotation coaxially of the upper portion 26 of hopper 9.

Shaft 22, which is indexed periodically, is supported for rotation on a stud, which projects up into the lower end of hub 20, as shown in Figure 8. The stud, which takes the weight of the shaft 22, the table, and the other equipment carried thereby, is supported on cross beams 30, which extend across the top of the lower funnel shaped portion of hopper 9. The upper end of shaft 22 is carried by bearing 32, supported as shown in Figure 13 by the upper frame of the hopper 9.

Secured to the top of the plates 19, as by welding, are an outer rim of circular angle iron 34, and an intermediate annular plate 36, and secured to the top of the hub 20 by screws is an inner annular member 38. Carried upon the table 18 and spaced equally therearound are four measuring containers 40 (see Figure 3), which are sequentially filled from spout 10, which projects through cover 52 of hopper 9.

Means, subsequently to be described, index shaft 22 to bring an empty container 40 under spout 10 and hold it in such position until that container is filled. When the container is filled, the rotatable table is automatically advanced to bring another empty container under the filling spout 10, and to stop it in such position, whereupon the previously filled container is emptied in the left hand side of hopper 9. Electric switch means, presently to be described, operates each time the container carrying table is indexed, and in turn operates, through a circuit 44 the counter or calculating meter 46, shown in Figure 1, thereby giving a continuous indication of the number of containers which have been dumped into hopper 9 during the particular loading operation.

The cylindrical side portions of each of the measuring containers 40 are supported on the rotatable table as by welding the bottoms of the lower flared portions 48 of the containers 40 to members 34 and 38, as shown in Figure 8. Top frame plate 50, which is rigidly attached to the tops of the measuring containers, has holes therethrough of the same size as the interior of the containers thereby allowing the passage of the powdered material from spout 10 into such containers. Spout 10 extends down through cover plate 52 of hopper 9 and terminates at a hole in plate 54 at the filling station (Figure 8), such plate extending across the top of the hopper, as shown in Figure 3. Around the hole in plate 54, on the bottom part of such plate, there is provided a wearing plate 56 which lightly rubs top frame plate 50 to make a seal between spout 10 and the particular container being filled.

Each of the measuring containers is closed at the bottom by means of a valve member 58 in the shape of a cone with an included angle such that the elements of the cone are inclined to the horizontal at an angle greater than the angle of repose of the material being measured. Valves 58 are held in their upper, container closing, position at all times, against the gasket 78 affixed to the inside of the flared portion 48 of each container (see Figure 14) except when over the left hand side of hopper 9 (Figure 2), where the containers dump, by means of the interrupted circular track 60 (see Figure 5) supported in fixed relationship with hopper 9 by means of cross members 30. Running on track 60 and thus holding valves 58 in closed position are casters 62, each of which is secured by screw 64 to piston-like member 66 which is slidable in the lower end of sleeve 68 affixed to the member 36 of the table. The outer end of guide screw 64 extends through a vertical slot in sleeve 68, the bottom end of member 66 contacting member 70 to form a stop for the travel of member 66. The upper end of sleeve 68 has a coaxial hole therethrough admitting plunger rod 72, to which valve 58 is attached. The inner end of rod 72 is provided with an enlarged head 74 between which and member 66, coil spring 76 is positioned in sleeve 68. Thus valve 58 is held in its upper closed position when caster 62 rides on track 60 in all but the dumping position, at which position the track is interrupted, and insures a tight seal between the valve 58 and the gasket 78 at the lower flared edge of the container. The placing of the sealing gasket at the lower flared edge of the container is advantageous because it is out of the direct path of flow of the material when the conical valve is lowered, and thus receives but little wear. At the dumping position, track 60 is interrupted (see Figure 5) thus allowing casters 62 to drop a sufficient amount when in that position to open valve 58. When the filled container is carried by the table 18, during indexing of the latter, to the point where the caster 62 of its valve runs off the abrupt end 61 of track 60, the valve is dropped quickly and stopped with a jar, thus insuring dislodgement of all material in the container and on the valve. After leaving the dumping station, upon further indexing of table 18, the containers are closed by the riding of casters 62 up on to the sloping end 62' of track 60.

In Figure 8 there is shown the upper portion of a container 40 located under spout 10 in position for filling. Pulverulent material from conveyor 4 flows into the container through the spout 10 past a rotating paddle or vaned wheel 80 mounted on shaft 82 (see Figure 12). The paddle wheel is located in the spout so that the greater part of it lies under overhang 84, and thus does not impede the flow of material to any great extent. When, however, the container becomes filled and the pulverulent material backs up and becomes compacted in spout 10 to a substantial extent, the paddle wheel, which is frictionally driven, becomes jammed by the material and ceases to rotate, thereby initiating in a manner to be described, an indexing movement of the container carrying table to bring an empty container under the filling spout, and to cause dumping of the previously filled container.

Shaft 82 carrying the paddle wheel is driven by continuously rotating motor 86 located on support 88 through speed reducing means 90 and shaft 92. Interposed between shafts 82 and 92 is an adjustable frictional driving means contained within housing 94 whereby the torque with which paddle wheel 80 is driven may be manually adjusted. The value of the driving torque selected depends upon the character of the pulverulent material and the degree of compaction of the pulverulent material in spout 10 which it is desired will cause initiation of the aforesaid indexing movement of the container carrying table. The adjustable frictional driving means for the paddle wheel is more fully shown in Figures 9, 10, and 11. As shown, shaft 92 projects through stationary bearing members 96 and into the right hand, cup-shaped end of shaft 98. Slots 100 in said cup-shaped end cooperate with pin 102 on shaft 92, whereby shaft 98 may slide relative to shaft 92 while being rotated thereby. Shaft 98 has positioned thereon a transverse flange 104 cooperating with rollers 106 carried by arm 108 on slide 110. Such slide is reciprocable in ways formed by angular members 112 attached to housing 94, and is held in predetermined adjusted position by means of screw 114 threaded into nut 116 on the housing 94. The forward end of screw 114 projects through a hole in the depending end of slide 110, as shown, and is held therein by collars 118 on the screw on opposite sides of said depending end.

Shaft 98 is carried, in its central portion, in bearing 120 in which it may slide longitudinally. The forward end of shaft 98 is provided with a counterbore in which is located coil spring 122 bearing upon an enlarged head of a stud 124. The forward end of stud 124 abuts against the central portion of friction disk 126, fixed to the inner end of shaft 82. Thus spring 122 thrusts shaft 98 to the right and maintains plate 104 on shaft 98 constantly in contact with the positioning rollers 106. Attached to the forward counterbored end of shaft 98 is a circular plate 128, upon which are fixed rearwardly directed cylindrical shells 130, each of which contains a compression spring 132. Studs 134, and friction plate 136 to which they are attached, are thus urged toward the friction plate 126 by springs 132 acting upon the inner enlarged spring engaging heads of the studs. Such heads engage plate 128 when the friction plates are completely separated from each other. By means of the structure shown in Figures 9, 10 and 11, the amount of torque imposed upon shaft 82 may readily be varied depending upon the extent to which shaft 98 is advanced to the left, in Figure 9, after friction plates 126 and 136 have been engaged by a suitable adjustment of screw 114. Therefore, paddle wheel 80 may be driven so that it is stopped by only a slight retarding force, which condition would be suitable when very light impalpable powders are being measured, up to an almost positive drive of the paddle, which might be necessary when relatively coarse, hard materials are being measured.

As has been indicated, indexing of the measuring containers is initiated when rotation of the paddle wheel is stopped by the packing of material thereabout. The initiation of such indexing is accomplished by a mechanism such as shown in Figures 6 and 7. Shaft 82, upon which paddle wheel 80 is mounted, runs through housing 138 containing an automatic switch mechanism. Within housing 138 the shaft 82 is supported for rotation by bearings supported by standards 140 and 142. Secured upon shaft 82 by the pin 144 for rotation with the shaft is a circular drum 146 made of cured molded synthetic resin or similar strong insulating material. Drum 146 as shown in Figures 6 and 7, is closed at the left-hand end in Figure 7 and open at the right-hand end. The drum carries within it a centrifugal switch mechanism, shown at the left in Figure 6, the drum being provided with a thickened portion, diametrically opposite it to insure its dynamic balance. Secured to the inner circumference of the drum is the support 149 for the movable contact arm, such support carrying inwardly directed spaced upstanding ears 151 pivotally mounting the movable contact member 150, which, as shown, is of generally L shape. One arm 151' of such generally L shaped member 150 is provided with a shoulder and an outer threaded end so that a series of disk shaped weights 152 may be retained thereon by nut 153. It will be apparent that upon rotation of the drum the support 149 and the arm 150 travel with it and that the weight carrying arm 151' is impelled in a direction outward of the axis of rotation of the drum by centrifugal force.

The other arm 154 of the movable contact carrying member 150 is provided with a contact 155 near its outer end, such contact cooperating with the fixed contact 161 carried upon support 159, likewise secured to the inner periphery of the drum. Coil spring 156, positioned between the support 149 and the arm 154, maintains the contacts 155 and 161 together in current-carrying relationship when the drum is at rest, the spring being overpowered and the contact opened, however, by centrifugal force when the drum rotates at an appreciable speed. Movement of arm 151' outwardly upon rotation of the drum is limited by stop 157. Imbedded in the flange of drum 146 are conducting slip rings 147 and 148' concentric with the shaft 82. The contacts 155 and 161, respectively, are connected to rings 147 and 148' by flexible wires as shown in Figure 6. Connection of the slip rings in the operating circuit shown in Figure 15 is effected by means of the brushes 163 and 165 which are supported by, but insulated from, the support 142. It will be apparent that the centrifugal switch above described maintains the circuit energizing coil R of the relay open when paddle wheel 80, and thus drum 146, is rotating, and closes the circuit therethrough when the paddle wheel and the drum 146 are brought substantially to rest.

For indexing the measuring container carrying table 18 there is provided a constantly running motor 158 which drives a speed reducing mechanism 160 through a clutch and brake mechanism 162 operated by solenoid 164 (see Figure 2). The clutch and brake mechanism 162 is of a well-known type wherein energization of solenoid 164 releases the spring operated brake and engages the clutch, and deenergization of solenoid 164 allows the spring to apply the brake and disengage the clutch. A pulley 166 on the driven shaft of the speed reducer drives vertical shaft 22 through the medium of pulley 168, affixed to the latter, and through belts 170 running over such pulleys.

Keyed to vertical shaft 22 below the upper bearing 32 is an indexing disk 172 having four notches 174 spaced equally about the circumference thereof in the proper position so that when indexing plunger 176 is engaged in any one of the notches 174, one of the measuring containers 40 is at the dumping station and another is at the filling station. (Figures 13 and 15.) Plunger 176 is supported for reciprocating movement toward and away from disk 172 in bracket 178. The plunger is normally held in the forward position in engagement with the disk by compression coil spring 182 positioned therearound and acting between the wall of hopper 9, through which the plunger passes and a collar 177 adjustably secured on the plunger by a set screw 177. Plunger 176 may be retracted from engagement with the indexing disk by energizing solenoid 186, which has within it a solenoid plunger which is a prolongation of plunger 176. In its retracted position the forward end of the plunger 176 is pulled well out from the notches 174 to allow rotation of shaft 22. Also carried by plunger 176 are two insulated switch arms 192 and 194, whose function will be explained in connection with the wiring diagram in Figure 15.

As shown in that figure, the power for operating constantly running motors 86 and 158 is supplied through leads 196 and 198, respectively, which are attached to the power source L₁ and L₂. Solenoid 164 is likewise supplied by the same source through leads as shown and through contacts C—C, which are closed upon energization of relay R. Such relay is energized from a control source L₃ and L₄, through closing of the switch in switch housing 138, which as has been described, occurs upon stopping of the paddle wheel 80.

Indexing plunger operating solenoid 186 is supplied with current from source L₁—L₂ through leads 202 and 204 and contacts C′—C′, such latter contacts likewise being closed upon energization of relay R. One lead 188 to solenoid 186 is connected to line 202, whereas the other lead 190 is connected to line 204 through normally closed thermally opened switch 206, and thus solenoid 186 is energized and the indexing plunger 176 is retracted upon stoppage of paddle wheel 80 to allow indexing of table 18 In order to make the plunger 176 again operative to stop table 18 accurately at its next position, thermally operated switch 206 functions to break the circuit to solenoid 186 after such switch has been subjected to heat by heating coil 208 for a selected period of time. Initiation of the heating of heating element 208 for the thermally operated switch 206 is accomplished when switch arm 192 makes contact with switch contacts 210 and 212, which occurs when the indexing plunger is retracted. In this instance, the time that it takes switch 206 to break the circuit is chosen such that the plunger 176 is retracted from a notch 174 and is shortly thereafter released after the notch has passed by it so that it is again pressed forward by the spring 182 and so that the forward end of the plunger rides on the periphery of the indexing disk in a position between the notch which it formerly occupied and the next notch on the disk. When such next notch thus arrives opposite the plunger, and the end of the plunger falls into the notch, shaft 22 and table 18 carried thereby are stopped. The cooling characteristics of heating element 208 and the lag in closing of the switch 206 are made such that the switch 206 and consequently the circuit to the plunger operating solenoid 186 is not again closed before the opening of contacts C′—C′ by relay R upon the resumption of rotation paddle wheel 80, which occurs when an empty container 40 is presented at the filling station and paddle wheel 80 is again freed.

Each time the plunger 176 is retracted, switch arm 194 bridges contacts 214 and 216, thus also completing the circuit through wires 44 to the calculating meter 46. Accordingly, the meter registers each time the indexing plunger has been retracted, which is the same as the number of containers 40 which have been dumped.

The device described provides a means whereby the volume of material loaded into a container, such as car 17, is continuously measured. Because the pulverulent material is handled uniformly throughout the measuring operation, that is, stoppage of the paddle wheel in each case occurs when each container has been filled and packed to a uniform degree, the measured volume of material bears a substantially constant relationship to the weight of material dispensed, and thus the device of the present invention gives an accurate measurement of weight, as well as of volume, within commercial tolerances.

Calculating meter 46 may thus be calibrated, for a given adjustment of friction drive means 94 and with a given material, to give a reading of total weight of material dispensed as well as a reading of total volume of such material. It should be pointed out that paddle wheel 80 should be placed high enough above the measuring container to allow substantially uniform packing of the material under the paddle wheel, as well as elsewhere in the spout. on the other hand, the volume of spout 10, including that under offset 84, should be considerably less than the volume of each measuring container, in order that sufficient time may elapse after placement of an empty container under the spout to allow dumping to take place completely from the previously filled container.

Whereas a particular embodiment of the mechanism has been described, it is to be understood that the subject matter of the present invention is capable of numerous variations obvious to one skilled in the art, and that its scope is defined by the accompanying claims.

I claim:

1. Apparatus for handling pulverulent material in bulk and measuring the same by volume, comprising a conveyor for delivering the material, a filling spout connected to the conveyor, and material measuring means fed by the spout, said measuring means comprising a plurality of measuring containers mounted for alternate indexing movement into juxtaposition with the filling spout at a filling station and into a dumping station in position to be dumped, means for indexing the measuring containers, a paddle wheel located in the feeding spout, means for rotating the paddle wheel, and a control switch rotating with the paddle wheel and effective on stoppage thereof to initiate operation of the container indexing means.

2. Apparatus for handling pulverulent material in bulk and measuring the same by volume, comprising a conveyor for delivering the material, a filling spout connected to the conveyor for delivering the material, and material measuring means fed by the spout comprising a table, a plurality of open topped measuring containers mounted on said table, said table being mounted for movement about a central axis to bring the containers successively under the spout, means between the spout and the container in juxtaposition therewith making a close fit therebetween, means on the table cooperating with each container to close the bottom thereof at the filling station and to open it at a dumping station angularly displaced from the filling station, means for indexing the table about its axis to carry a filled measuring container away from the filling station and an empty container into the filling station, a paddle wheel located in the feeding spout at least partially in the path of material fed therethrough, means for rotating the paddle wheel, and means responsive to stoppage of the rotation of the paddle wheel by packing of the material thereabout to initiate operation of said indexing means.

3. In the apparatus set out in claim 2, the means for rotating the paddle wheel being a constantly rotating motor, and a slip clutch located between such motor and the paddle wheel, the means responsive to stoppage of the rotation of the paddle wheel being an electric switch member so connected to the paddle wheel that is initiates operation of the indexing means when the paddle wheel is stopped.

4. The apparatus set out in claim 2, including a bypass delivery duct arranged to receive material from said conveyor at a point beyond the point at which the spout is connected, whereby material being delivered by said conveyor to said spout is prevented from unduly packing and accumulating at the spout during intervals in which the flow of material through the spout is stopped during indexing of the containers.

5. Apparatus for handling pulverulent material in bulk and measuring the same by volume, comprising a conveyor for delivering the material, a filling spout connected to the conveyor for delivering the material, and material measuring means fed by the spout comprising a plurality of measuring containers mounted for movement alternately into a filling station wherein a container is placed in substantially pulverulent material tight relationship with the spout, and a dumping station, the spout having an overhanging portion to provide a space therein substantially out of the line of flow of the material therethrough, a rotatable paddle wheel so located in the spout that a major portion thereof lies under said overhanging portion of the spout, a yieldable driving means for said paddle wheel which allows stoppage thereof when the container in communication with the spout is filled and the material packs about the paddle wheel in the spout, and means responsive to stoppage of the paddle wheel for indexing the measuring containers to bring an empty container into communication with the filling spout.

PERRY F. OVERMYER.

REFERENCES CITED

The following references are of record in the file of this patent:

UNITED STATES PATENTS

| Number | Name | Date |
|---|---|---|
| 13,397 | Postley | Aug. 7, 1855 |
| 308,001 | Sommer | Nov. 11, 1884 |
| 349,971 | Baird | Sept. 28, 1886 |
| 377,417 | Wiley | Feb. 7, 1888 |
| 476,608 | Calkins | June 7, 1892 |
| 640,625 | Braun | Jan. 2, 1900 |
| 928,658 | Hoyt | July 20, 1909 |
| 1,037,794 | Newton | Sept. 3, 1912 |
| 1,082,354 | Mulloy | Dec. 23, 1913 |
| 1,274,977 | Bird | Aug. 6, 1918 |
| 1,938,669 | Smith | Dec. 12, 1933 |
| 2,042,627 | Quinn | June 2, 1936 |
| 2,320,767 | Washburn et al. | June 1, 1943 |

FOREIGN PATENTS

| Number | Country | Date |
|---|---|---|
| 303,606 | Italy | Dec. 10, 1932 |

Certificate of Correction

Patent No. 2,471,494. May 31, 1949.

PERRY F. OVERMYER

It is hereby certified that errors appear in the printed specification of the above numbered patent requiring correction as follows:

Column 7, line 23, for "screw 177" read *screw 177*; column 9, line 29, for the words "that is" read *that it*;

and that the said Letters Patent should be read with these corrections therein that the same may conform to the record of the case in the Patent Office.

Signed and sealed this 8th day of November, A. D. 1949.

[SEAL]

THOMAS F. MURPHY,
*Assistant Commissioner of Patents.*